United States Patent
Maruyuma et al.

[11] Patent Number: 5,335,059
[45] Date of Patent: Aug. 2, 1994

[54] METHOD AND APPARATUS FOR MEASURING LENS PERFORMANCE

[75] Inventors: Koichi Maruyuma; Syun'itirou Wakamiya; Makoto Iwaki, all of Tokyo, Japan

[73] Assignee: Asahi Kogaku Kogyo Kabushiki Kaisha, Tokyo, Japan

[21] Appl. No.: 878,553

[22] Filed: May 5, 1992

[30] Foreign Application Priority Data

May 13, 1991 [JP] Japan .................. 3-205002

[51] Int. Cl.⁵ .............................................. G01B 9/00
[52] U.S. Cl. .................................... 356/124; 356/125; 356/359
[58] Field of Search ............ 356/124, 125, 359, 360, 356/127

[56] References Cited

U.S. PATENT DOCUMENTS

| | | | |
|---|---|---|---|
| 3,782,829 | 1/1974 | Herriott | 356/127 |
| 4,275,964 | 6/1981 | Vassiliadis | 356/125 |
| 4,281,926 | 8/1981 | Cornsweet | 356/124 |
| 4,347,000 | 8/1982 | Lacoste | 356/360 |
| 4,526,467 | 7/1985 | Fantone | 356/124 |
| 4,641,962 | 2/1987 | Sueda et al. | 356/124 |
| 4,767,215 | 8/1988 | Borodovsky | 356/124 |
| 4,832,489 | 5/1989 | Wyant et al. | 356/359 |
| 4,958,931 | 9/1990 | Tatian | 356/360 |

*Primary Examiner*—Robert J. Warden
*Assistant Examiner*—Krisanne M. Thornton
*Attorney, Agent, or Firm*—Sughrue, Mion, Zinn, Macpeak & Seas

[57] ABSTRACT

A method and apparatus for lens measurement that provide for a small error of measurement where a light source used for measurement emits a beam of light at a wavelength different from an operating wavelength of a lens to be measured. The spherical aberration of the lens being measured, which occurs at the nonoperating wavelength, is identified and measured. An auxiliary lens is then placed in the path of the light source emitting the beam of light with the nonoperating wavelength to suppress the spherical aberration. This method allows for performance measurements of the lens to be obtained at the nonoperating wavelength without the adverse effects of the spherical aberration which occurred at the nonoperating wavelength.

20 Claims, 19 Drawing Sheets

SPHERICAL ABERRATION
SINE CONDITION

ASTIGMATISM

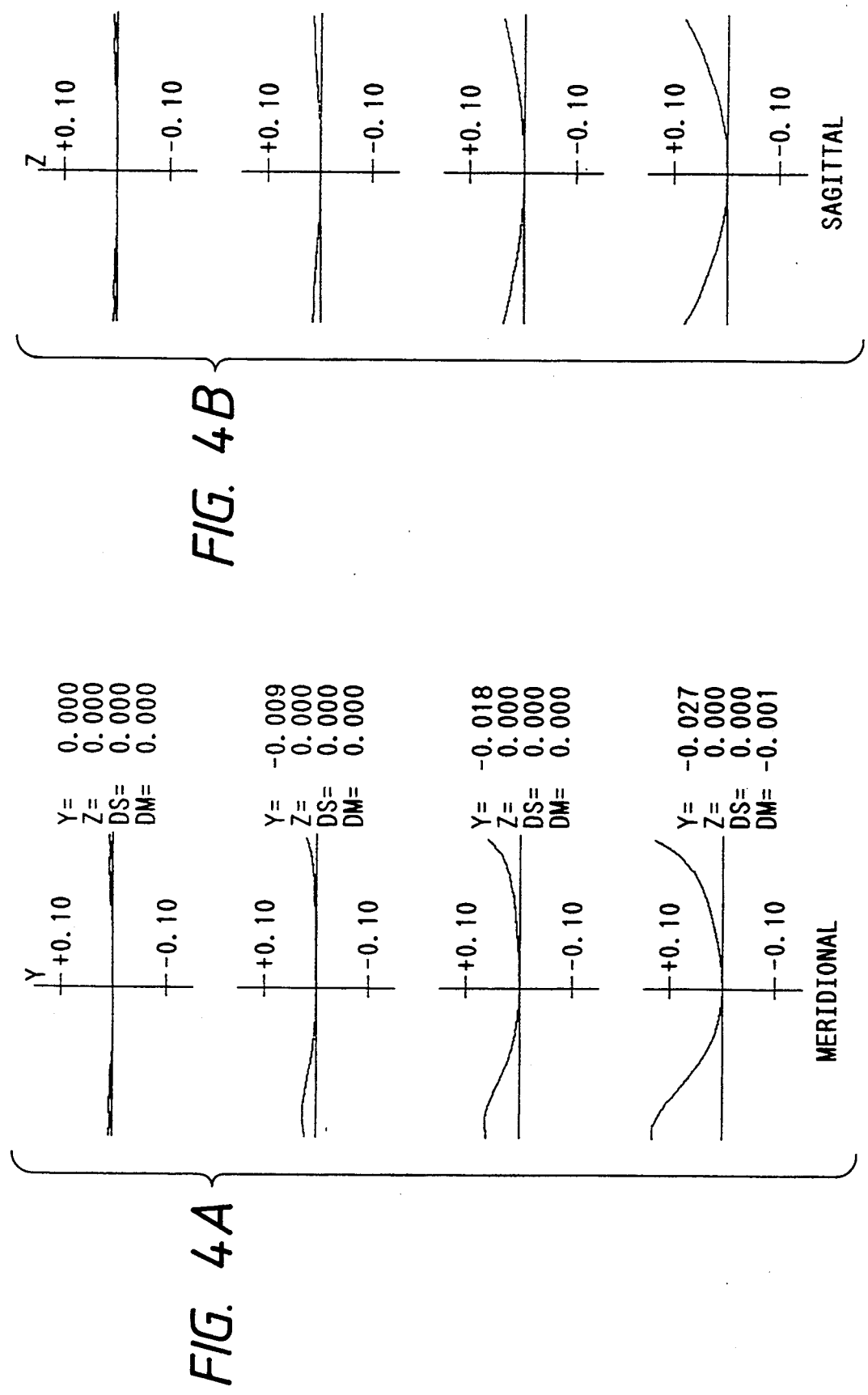

SPHERICAL ABERRATION
SINE CONDITION

ASTIGMATISM

SPHERICAL ABERRATION
SINE CONDITION

ASTIGMATISM

SPHERICAL ABERRATION
SINE CONDITION

ASTIGMATISM

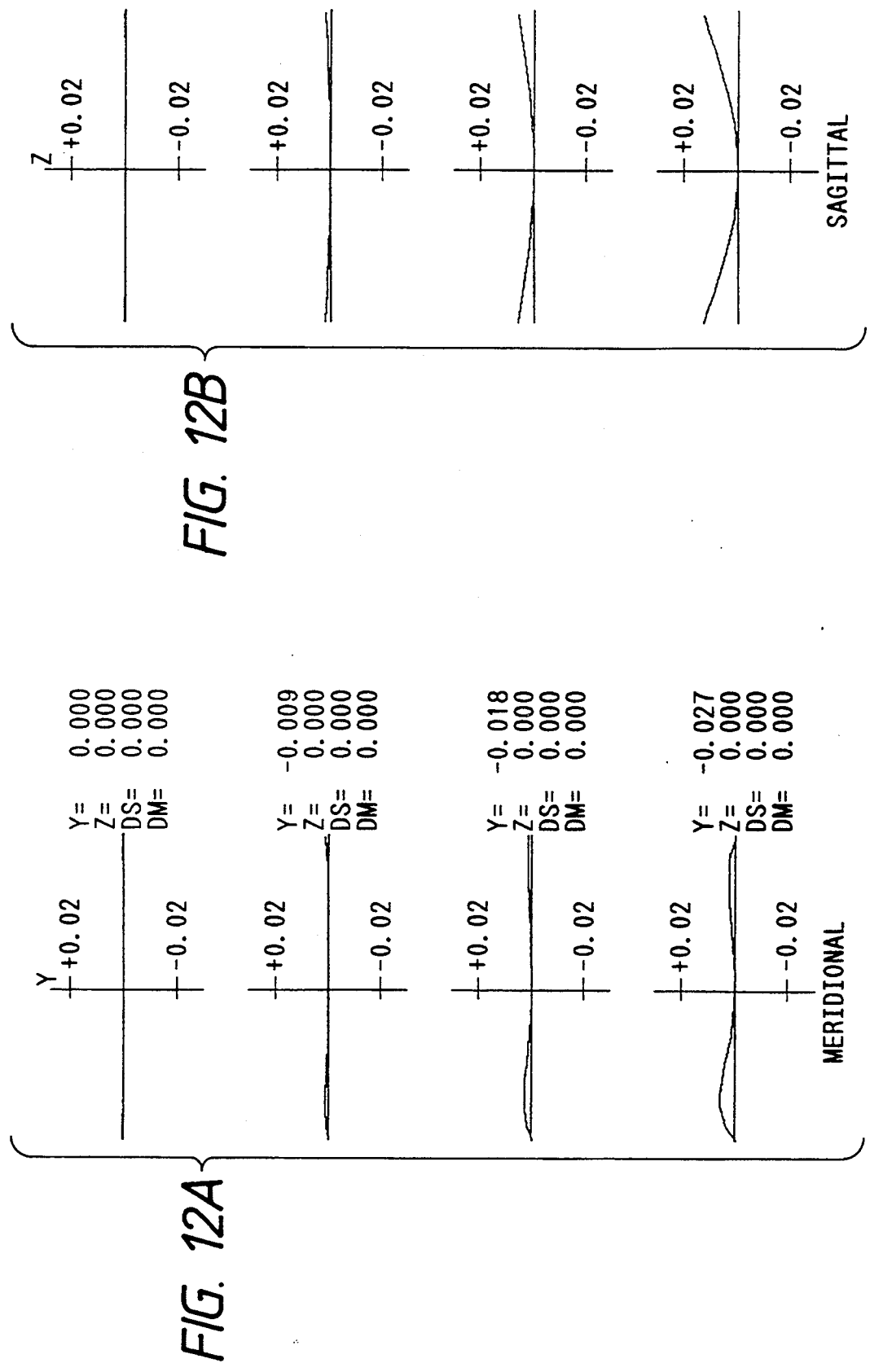

1:1.4

— SA
-- SC

-0.0005    0.0005

SPHERICAL ABERRATION
SINE CONDITION

W=1.6°

— S
-- M

-0.0005    0.0005

ASTIGMATISM

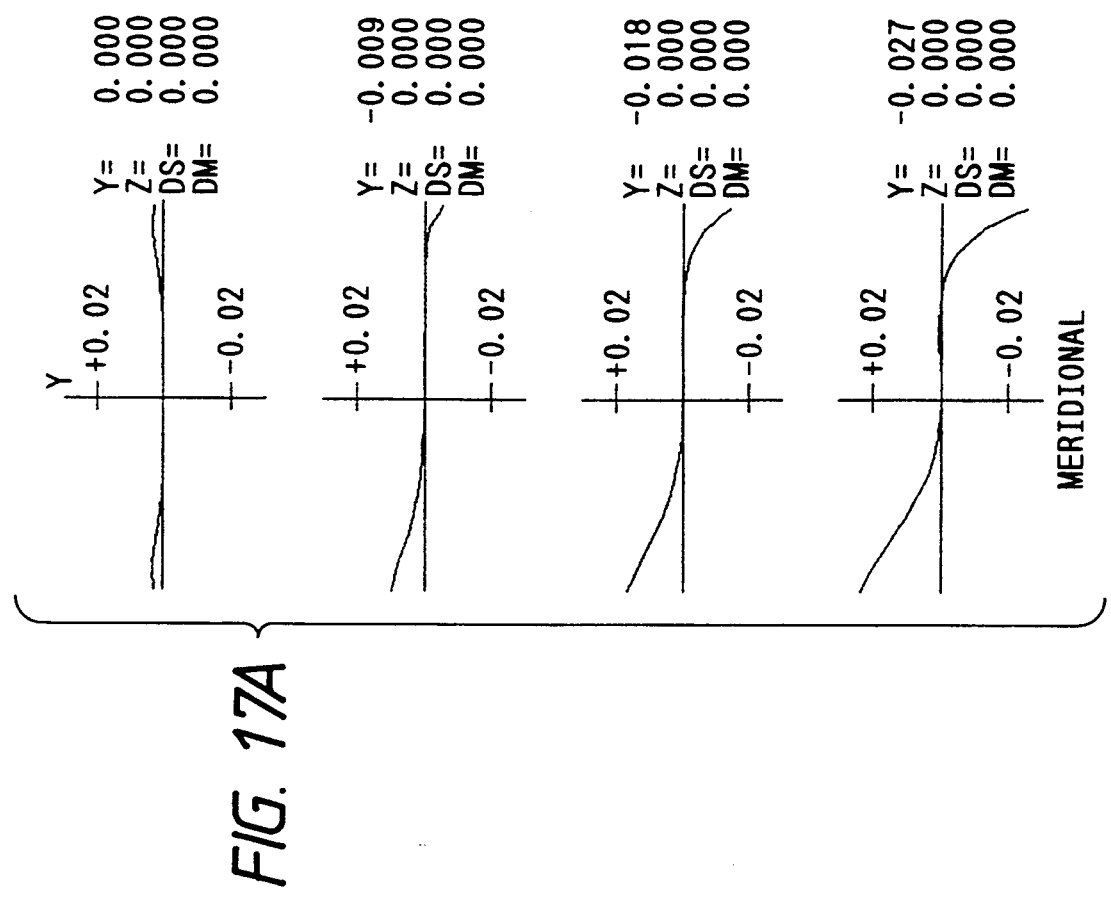

SPHERICAL ABERRATION
SINE CONDITION

ASTIGMATISM

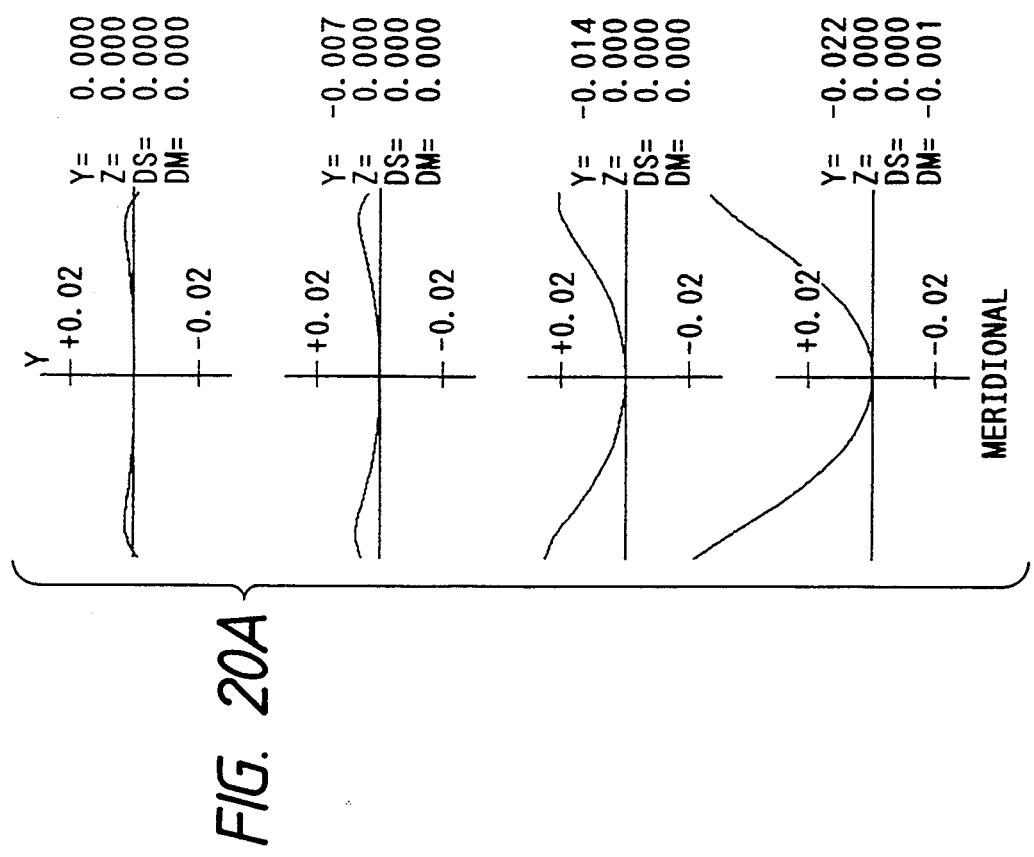

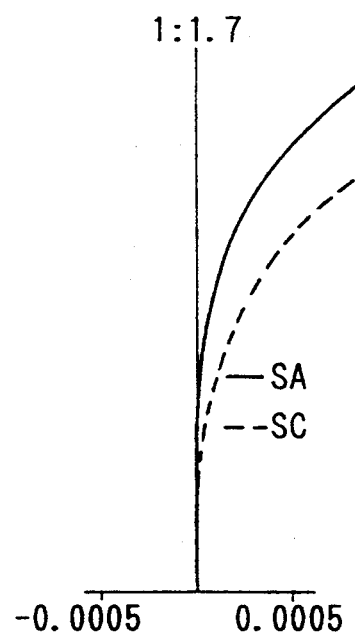 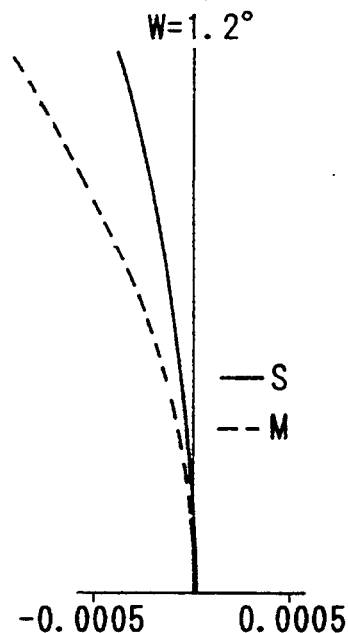

SPHERICAL ABERRATION
SINE CONDITION

ASTIGMATISM

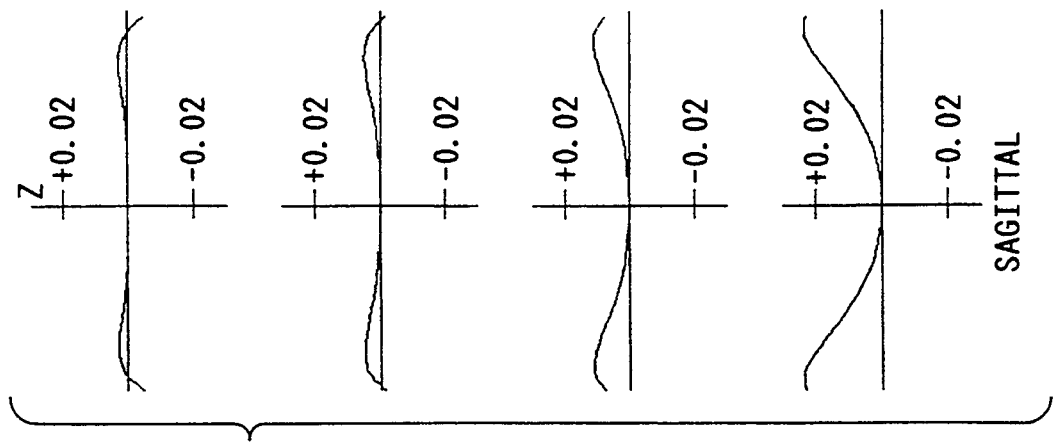
FIG. 25A
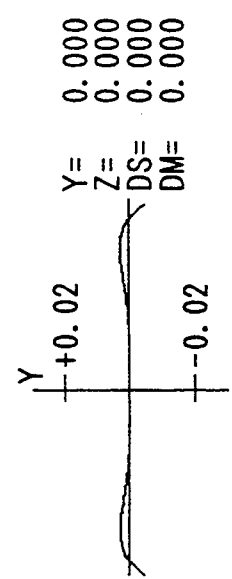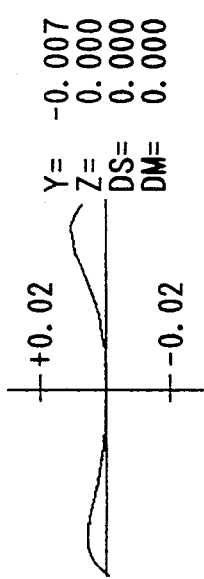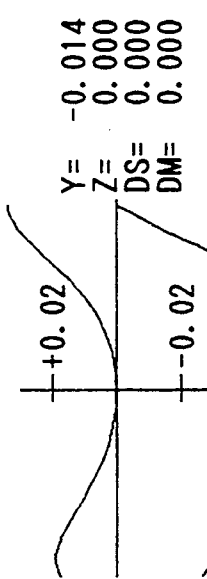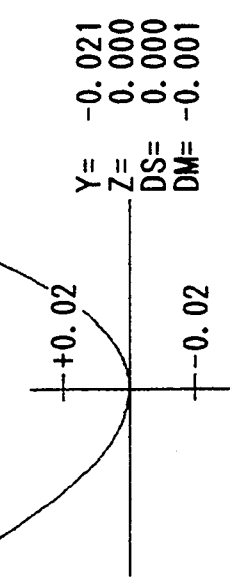
FIG. 25B

METHOD AND APPARATUS FOR MEASURING LENS PERFORMANCE

BACKGROUND OF THE INVENTION

This application is based on and claims priority from Japanese Application No. HEI 3-205002 filed May 13, 1991, the disclosure of which is incorporated herein by reference.

The present invention relates to a method for measuring performance characteristics of a lens to be used at an operating wavelength, by passing a light with a wavelength different from the operating wavelength through the lens.

Measurements for testing the performance of a lens are desirably obtained in an environment that is either identical or close to an actual environment in which the lens of interest is to be used. Therefore, when measuring lens performance it is preferred that a light source be used which emits rays of light at a wavelength similar to the operating wavelength.

Conventional lenses are sometimes adapted to be operated at wavelengths outside the visible range. If the performance of such a conventional lens is measured using an operating wavelength which is outside the visible range, the quality of the measurement resulting is undesirably poor. Accordingly, it is necessary to perform a measurement using a light source that emits at a wavelength in the visible range which is different from the operating wavelength. However, if the performance of the conventional lens is measured using a light source that emits at a wavelength which differs greatly from the operating wavelength, errors in measurement may occur from spherical aberrations which occur at the nonoperating wavelength.

SUMMARY OF THE INVENTION

The present invention was made in order to solve the above-mentioned problem. It is therefore an object of the present invention to provide a method of lens measurement that will produce a small error of measurement, where the light source used during measurement emits at a wavelength different from an operating wavelength.

To achieve this object, the present invention provides a method of lens measurement where rays of light are emitted from a light source at a wavelength different from an operating wavelength of an objective lens to be measured. The emitted rays are then transformed to plane waves by a beam expander, where the plane waves are split into a reference beam and a measurement beam. The resulting reference beam is directed to a reflecting mirror, whereas the measurement beam is directed through the objective lens to a concave mirror. The reference beam and the measurement beam are respectively reflected from the reflecting mirror and concave mirror and then directed through an imaging lens to form interference pattern on an image sensor.

The interference pattern is visually inspected, while tilting the reflecting mirror, thereby allowing for a measurement of aberration produced by the objective lens at the nonoperating wavelength. Upon completion of this measurement, an auxiliary lens is inserted in front of the objective lens to change the curvature of the measurement beam prior to entering the objective lens. This technique allows for the objective lens to produce an adjusted spherical aberration substantially equal to a normal spherical aberration which would occur if the objective lens were performing at its operating wavelength.

The present invention offers the advantage of removing the undesirable effects produced by the spherical aberration of the objective lens at the nonoperating wavelength. By adjusting the curvature of the light incident to the objective lens, the occurrence of the spherical aberration which occurs at the nonoperating wavelength can be suppressed to allow for a precise performance measurement of the objective lens.

The method of the present invention is not intended to be limited solely to the circumstance described herein. The present invention describes incident light being applied to the objective lens in a manner similar to actual operating conditions. However, the method of the present invention can be applied in circumstances where the incident light is applied to the objective lens in a manner other than that in which the objective lens is designed to be used. For example, the method of the present invention can be applied in the case where the objective lens is reversed in direction and incident light is applied to a nonreceiving surface of the objective lens to allow performance measurement of the objective lens.

BRIEF DESCRIPTION OF THE DRAWINGS

The invention will be more clearly understood from the following description in conjunction with the accompanying drawings, wherein:

FIGS. 4A and 4B show graphs plotting wavefront aberration curves for the objective lens of FIG. 2 while performing at the operating wavelength;

FIGS. 12A and 12B show graphs plotting wavefront aberration curves for the objective lens of FIG. 10 while performing at the operating wavelength;

FIGS. 17A and 17B show graphs plotting wavefront aberration curves at a measurement wavelength for the optical system composed of the objective and auxiliary lenses shown in FIG. 15;

FIGS. 20A and 20B show graphs plotting wavefront aberration curves for the objective lens of FIG. 18 while performing at the operating wavelength;

FIGS. 21A and 21B show graphs plotting spherical aberration, sine condition and astigmatism curves for the objective lens of FIG. 18 while performing at a measuring wavelength;

FIGS. 25A and 25B show graphs plotting wavefront aberration curves at a measurement wavelength for the optical system composed of the objective and auxiliary lenses shown in FIG. 23.

DETAILED DESCRIPTION OF THE INVENTION

Figure 1:
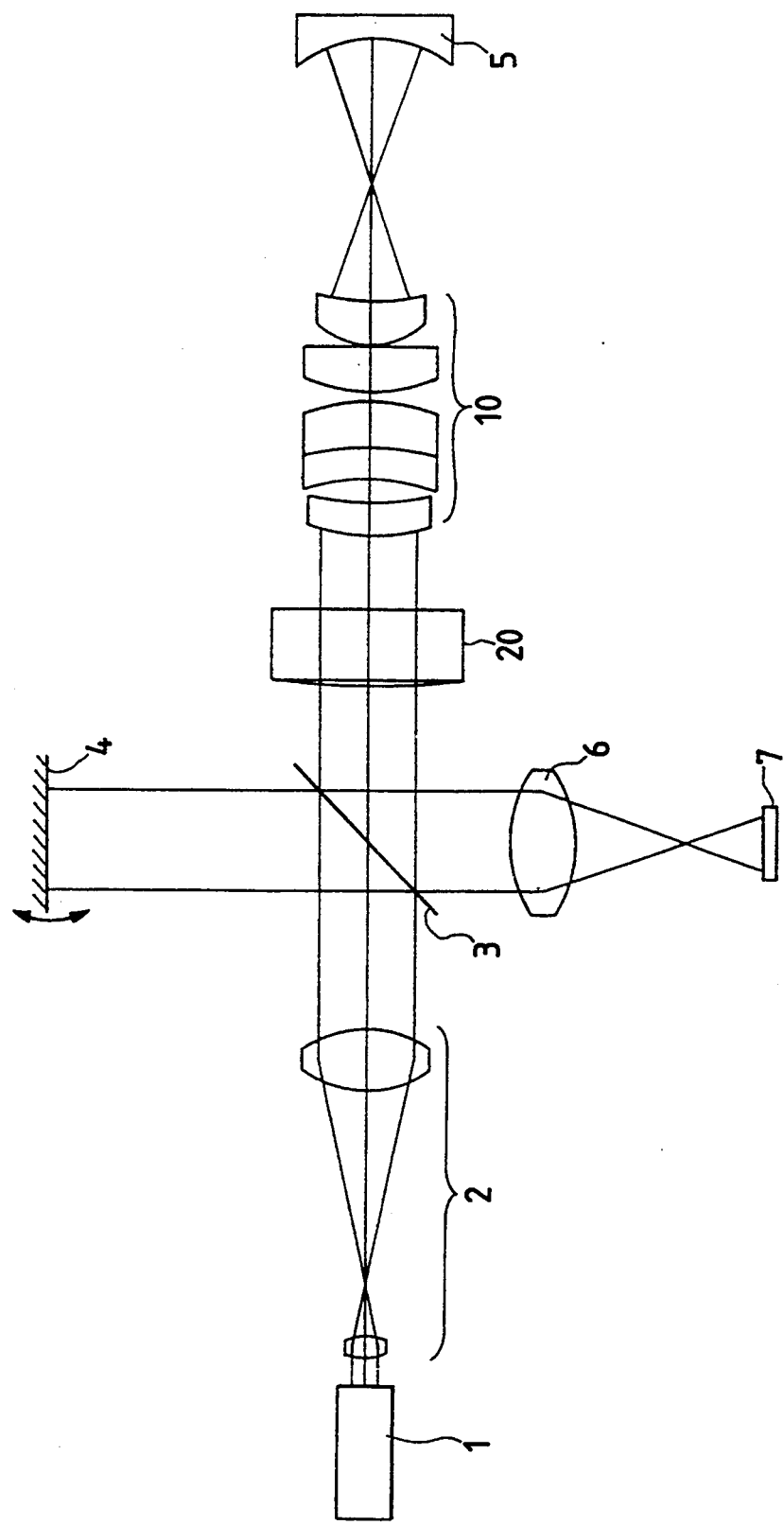
FIG. 1 is a diagram schematically showing an optical system used to perform lens measurement.

FIG. 1 shows a preferred embodiment of an optical system for lens measurement, where a laser light from an He-Ne laser 1 is expanded and collimated by a beam expander 2. The He-Ne laser 1 emits laser light with a wavelength different from an operating wavelength of an objective lens 10, which represents the lens to be measured. The collimated light is separated into two beams by a half-mirror 3. The component reflected by the half-mirror 3 is further reflected by a reference mirror 4, whereas the component transmitted through the half-mirror 3 passes through the objective lens 10 whereupon it is reflected by a concave mirror 5.

The beams reflected from the reference mirror 4 and the concave mirror 5 return to the half-mirror 3, where they are superimposed and directed to an imaging lens 6. The imaging lens 6 focuses the superimposed image to form an interference pattern on an image sensor 7. The output of the image sensor 7 is processed by an image processing circuit and displayed on a monitor, both of which are not shown in FIG. 1. Upon visual inspection of the monitor by an operator, the reference mirror 4 is tilted to produce an interference fringe, thereby allowing for aberration of the objective lens 10 to be measured at the nonoperating wavelength.

A weak-powered auxiliary lens 20 is then inserted in front of the objective lens 10 to change the curvature of an incident wavefront of parallel light rays which enter the objective lens 10. If the curvature of the incident wavefront of parallel light rays is properly adjusted, the objective lens 10 will produce a spherical aberration substantially equal to a spherical aberration produced as if it were performing at an operating wavelength.

When the shape of the incident wavefront of parallel light rays changes, the amount of aberration that develops also changes. Generally, the spherical aberration of the objective lens 10 will change in a negative direction if the incident wavefront of parallel light rays is caused to diverge, whereas the spherical aberration of the spherical lens 10 will change in a positive direction if the incident wavefront of parallel light rays is caused to converge. Thus, by appropriately selecting the curvature of the incident wavefront, the spherical aberration produced at the nonoperating wavelength can be adequately suppressed to allow for the performance of the objective lens 10 to be measured with a high degree of precision.

The amount of aberrational variations due to lens matching errors remains substantially constant notwithstanding the differences of wavelength, thereby allowing for a satisfactory performance measurement.

Preferably, the objective lens 10 and the auxiliary lens 20 used in the above described method satisfy the following condition:

$$|f/fc| < 0.04$$

where f is the focal length of the objective lens 10 to be measured and fc is the focal length of the auxiliary lens 20. This condition provides for the auxiliary lens 20 to maintain a weak power such that the spherical aberrations that develop due to the positional offset between the auxiliary lens 20 and the objective lens 10 is sufficiently minimized.

The resulting performance parameters of the objective lens 10 that are actually measured include eccentric comma, spherical aberration and astigmatism. The results of the measurements allow for the performance parameters of the objective lens 10 to be appropriately adjusted prior to placing the objective lens 10 into operation.

Three examples of the present invention are hereinafter described with reference to the accompanying drawings to clarify the effects of the invention. The lenses used in the three examples have large aperture ratios with an F number ranging from 0.8 to 1.7 and are designed to operate at a near-infrared wavelength of 880 nm.

EXAMPLE 1

Figure 2:
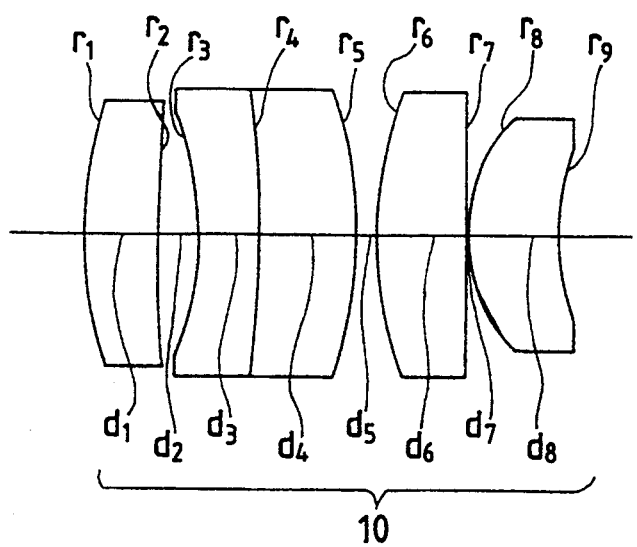
FIG. 2 is a simplified cross-sectional view of an objective lens used in Example 1.

FIG. 2 shows a simplified cross-sectional view of an objective lens 10 used in this example. Numerical data for the specific lens composition are provided in Table 1, wherein FNO denotes the F number of the objective lens 10, f the focal length of the objective lens 10, W the half-view angle, r the radius of curvature, d the distance between faces, N the refractive index at the d-line (588 nm), and ν the Abbe number.

Figure 3A:
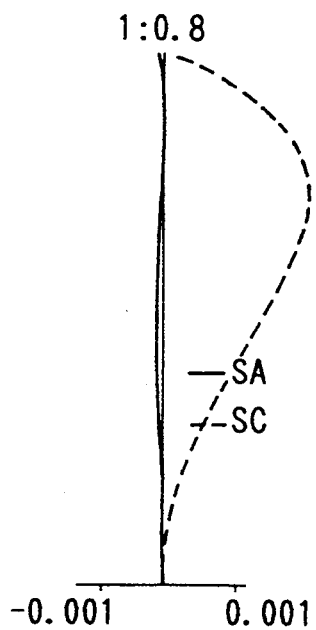
FIGS. 3A and 3B show graphs plotting spherical aberration, sine condition and astigmatism curves for the objective lens of FIG. 2 while performing at an operating wavelength.
Figure 3B:
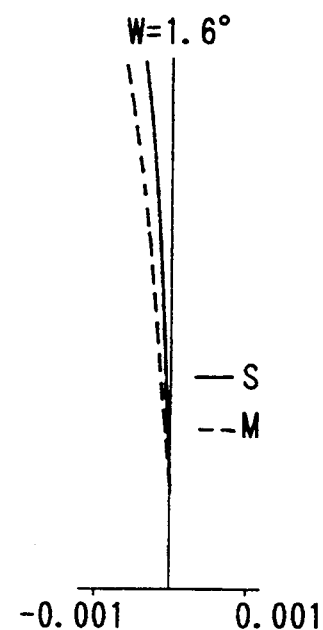

FIGS. 3A and 3B show a spherical aberration (SA), a sine condition (SC), a sagittal astigmatism (S), and a meridional astigmatism (M) at a design wavelength of 880 nm. FIGS. 4A and 4B show corresponding wavefront aberrations in the meridional and saggital directions, respectively, where a vertical axis of each graph plots the amount of aberration as measured in wavelengths.

Figure 5A:
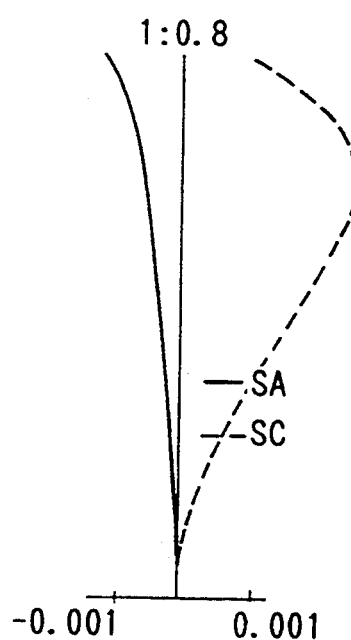
FIGS. 5A and 5B show graphs plotting spherical aberration, sine condition and astigmatism curves for the objective lens of FIG. 2 while performing at a measuring wavelength.
Figure 5B:
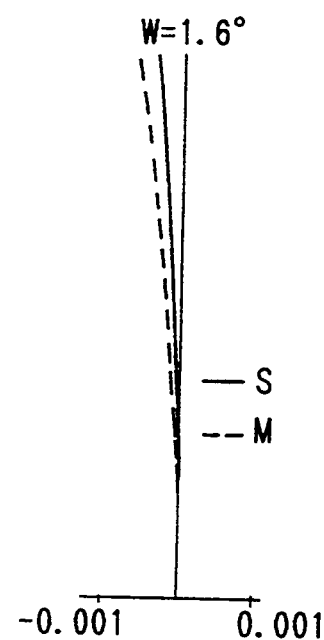
Figure 6B:
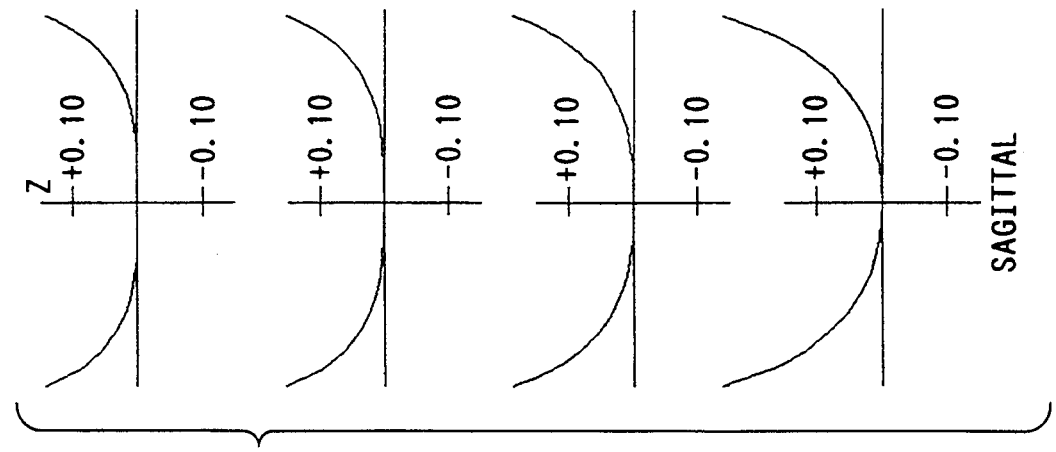
FIGS. 6A and 6B show graphs plotting wavefront aberration curves for the objective lens of FIG. 2 while performing at the measuring wavelength.
Figure 6A:
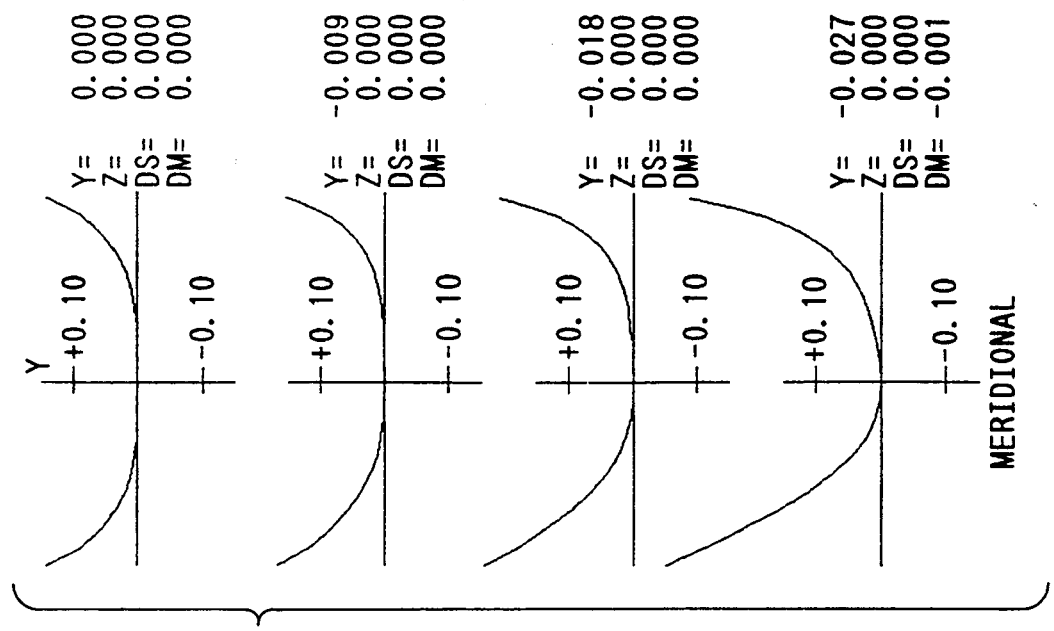

The performance of the objective lens 10 was measured with an He-Ne laser where λ=633 nm in the absence of the auxiliary lens 20. The spherical aberration, sine condition and astigmatism that developed are shown in FIGS. 5A and 5B. The corresponding wavefront aberrations are shown in FIGS. 6A and 6B.

TABLE 1

| Surface | FNO = 1:0.8 | f = 1.00 | W = 1.6° | |
|---|---|---|---|---|
| | r | d | N | ν |
| 1 | 2.037 | 0.342 | 1.77250 | 49.6 |
| 2 | 6.927 | 0.188 | | |
| 3 | −1.421 | 0.274 | 1.84666 | 23.8 |
| 4 | −4.974 | 0.445 | 1.61800 | 63.4 |
| 5 | −2.115 | 0.103 | | |
| 6 | 1.886 | 0.411 | 1.77250 | 49.6 |
| 7 | −32.842 | 0.017 | | |
| 8 | 0.753 | 0.411 | 1.77250 | 49.6 |
| 9 | 1.205 | | | |

Figure 7:
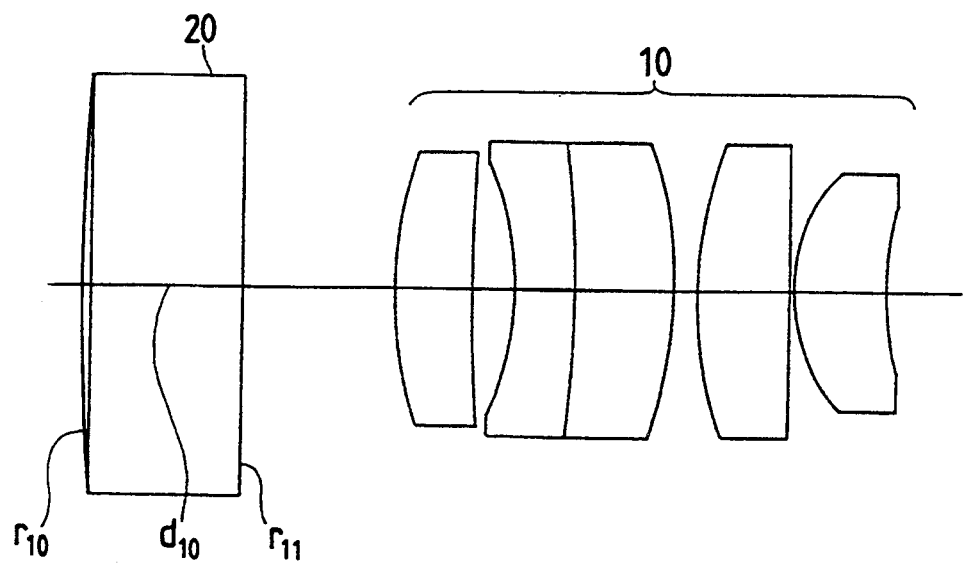
FIG. 7 is a simplified cross-sectional view of the objective lens used in Example 1 combined with an auxiliary lens inserted on an input side of the objective lens.
Figure 8A:
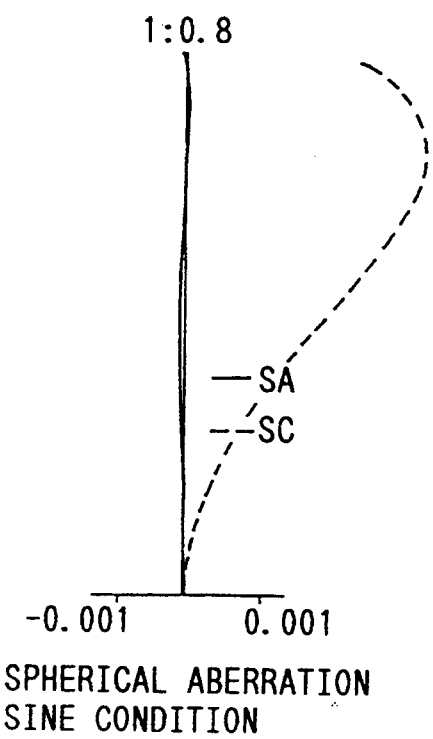
FIGS. 8A and 8B show graphs plotting spherical aberration, sine condition and astigmatism curves at a measurement wavelength for an optical system composed of the objective and auxiliary lenses shown in FIG. 7.
Figure 8B:
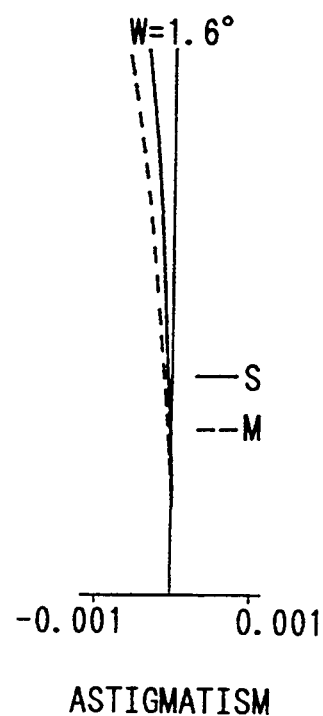
Figure 9B:
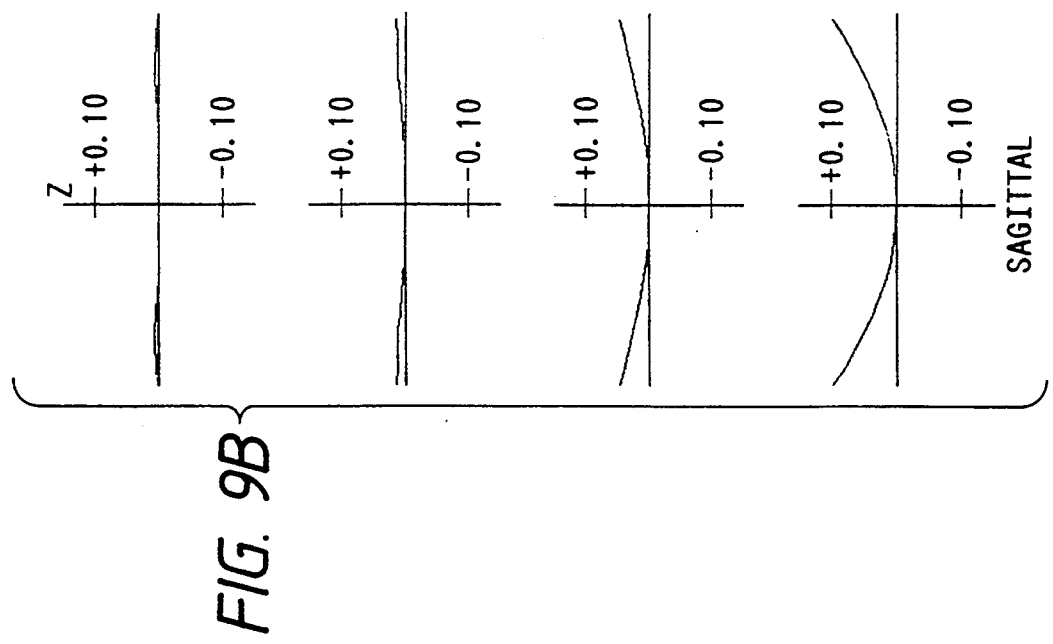
FIGS. 9A and 9B show graphs plotting wavefront aberration curves at a measurement wavelength for the optical system composed of the objective and auxiliary lenses shown in FIG. 7.
Figure 9A:
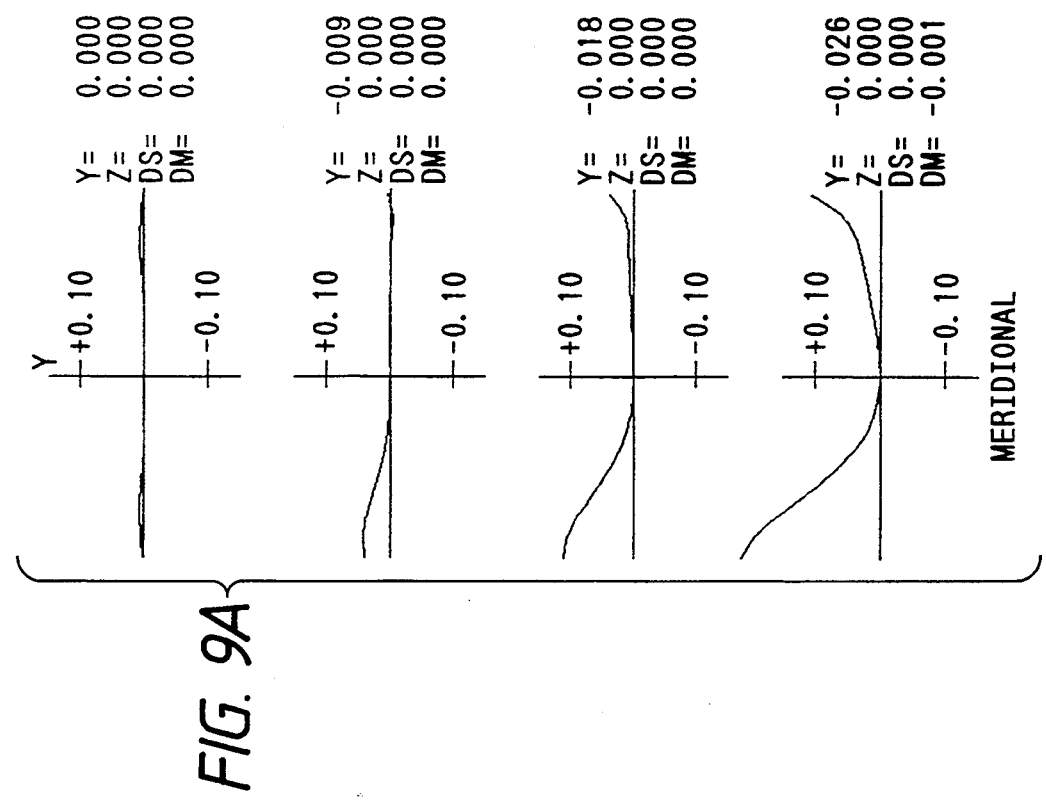

The performance of the objective lens 10 was measured in the presence of the auxiliary lens 20, as shown in FIG. 7, under the conditions outlined in Table 2, wherein fc denotes the focal length of the auxiliary lens 20. The spherical aberration, sine condition and astigmatism that developed are shown in FIGS. 8A and 8B and the corresponding wavefront aberrations that developed are shown in FIGS. 9A and 9B.

TABLE 2

| Surface | fc = 232.915 | f/fc = 0.004 | | |
|---|---|---|---|---|
| | r | d | N | ν |
| 10 | 119.863 | 0.685 | 1.51633 | 64.1 |
| 11 | ∞ | | | |

EXAMPLE 2

Figure 10:
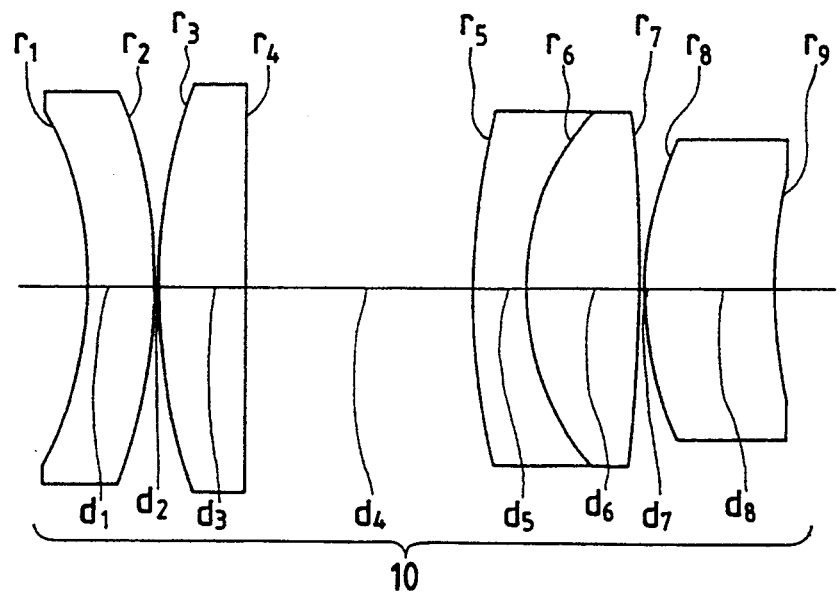
FIG. 10 is a simplified cross-sectional view of an objective lens used in Example 2.

FIG. 10 shows a simplified cross-sectional view of an objective lens 10 used in this example. Numerical data listing the composition of the objective lens 10 are provided in Table 3. The numerical data provided in this example are presented with the same nomenclature as described in Example 1.

Figure 11A:
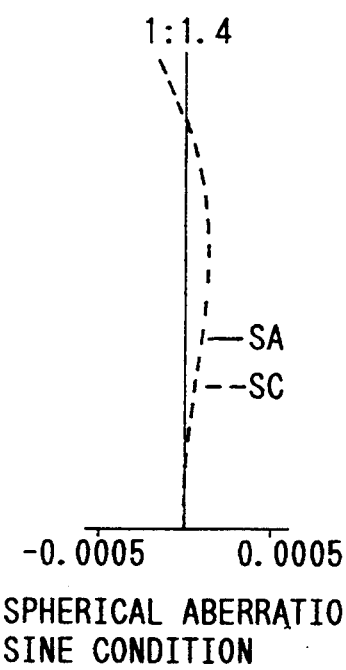
FIGS. 11A and 11B show graphs plotting spherical aberration, sine condition and astigmatism curves for the objective lens of FIG. 10 while performing at an operating wavelength.
Figure 11B:
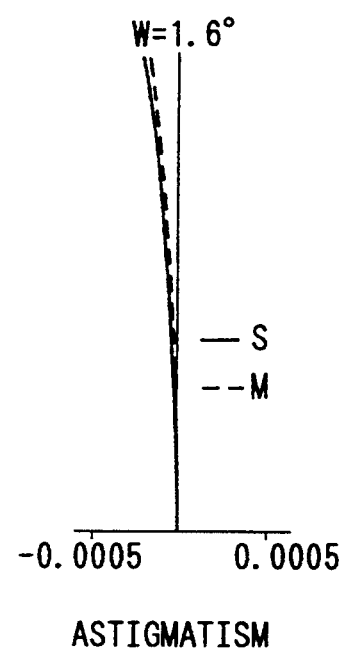

FIGS. 11A and 11B show a spherical aberration (SA), a sine condition (SC), a sagittal astigmatism (S), and a meridional astigmatism (M) at a design wavelength of 830 nm. FIGS. 12A and 12B show the corresponding wavefront aberrations in the meridional and saggital directions, respectively, where a vertical axis of each graph plots the amount of aberration as measured in wavelengths.

Figure 13A:
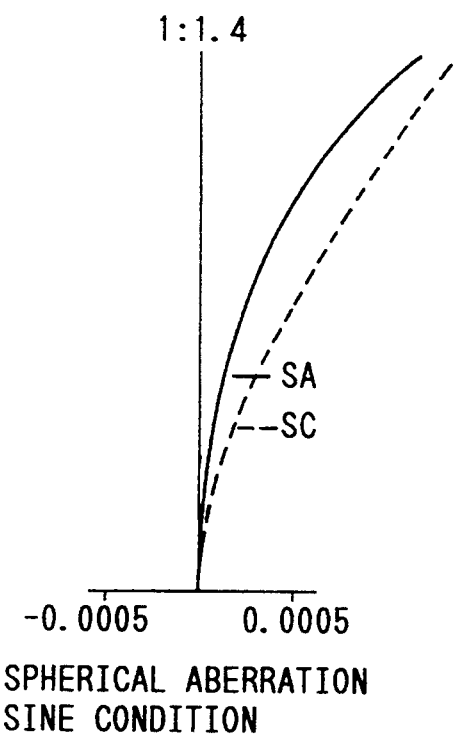
FIGS. 13A and 13B show graphs plotting spherical aberration, sine condition and astigmatism curves for the objective lens of FIG. 10 while operating at a measuring wavelength.
Figure 13B:
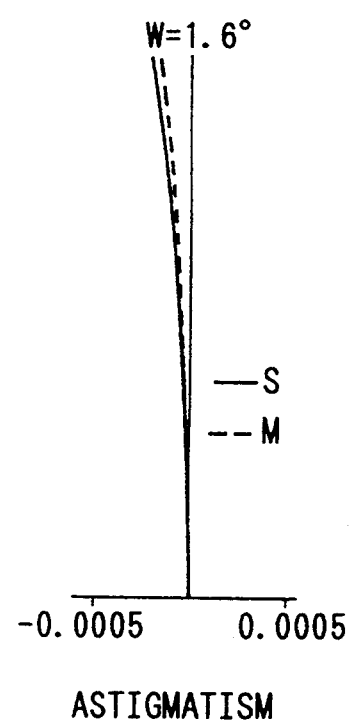
Figure 14B:
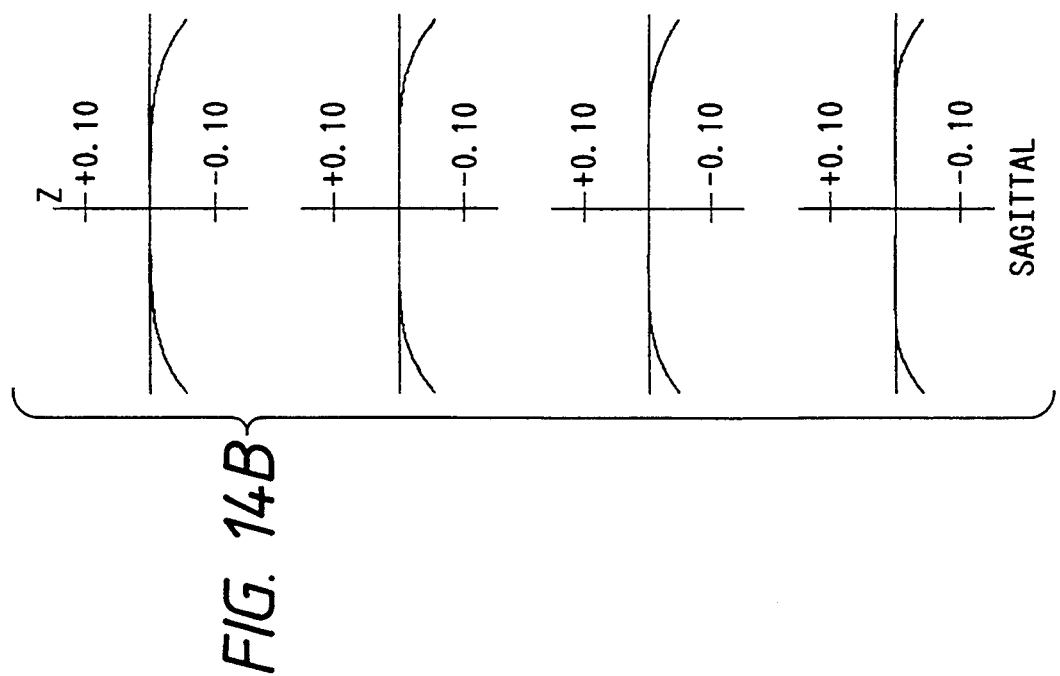
FIGS. 14A and 14B show graphs plotting wavefront aberration curves for the objective lens of FIG. 10 while performing at the measuring wavelength.
Figure 14A:
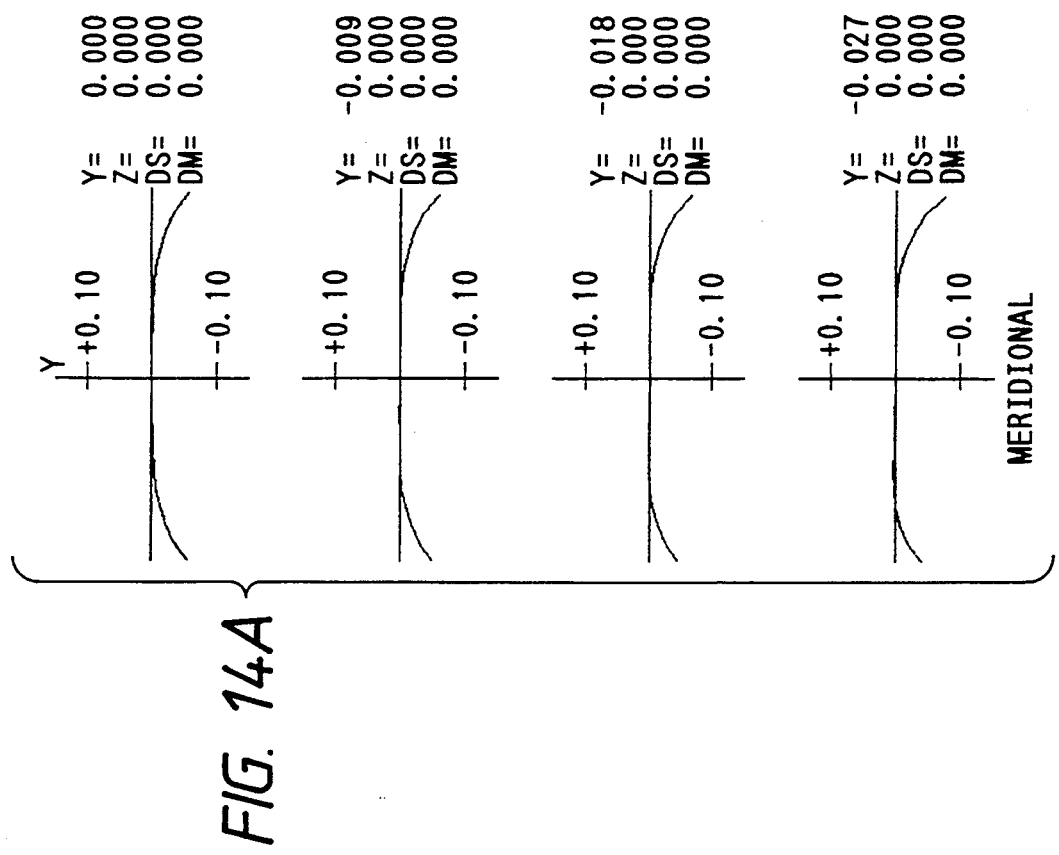

The performance of the objective lens 10 was measured with an He-Ne laser where λ=633 nm in the absence of an auxiliary lens 20. The spherical aberration, sine condition and astigmatism that developed are shown in FIGS. 13A and 13B. The corresponding wavefront aberrations are shown in FIGS. 14A and 14B.

TABLE 3

| Surface | FNO = 1:1.4 | f = 1.00 | W = 1.6° | |
|---|---|---|---|---|
| | r | d | N | ν |
| 1 | −0.762 | 0.137 | 1.67270 | 32.1 |
| 2 | −1.116 | 0.007 | | |
| 3 | 1.288 | 0.179 | 1.61800 | 63.4 |
| 4 | −27.635 | 0.466 | | |
| 5 | 1.553 | 0.110 | 1.84666 | 23.8 |
| 6 | 0.548 | 0.234 | 1.61800 | 63.4 |
| 7 | −2.911 | 0.007 | | |
| 8 | 0.738 | 0.263 | 1.88300 | 40.8 |
| 9 | 0.922 | | | |

Figure 15:
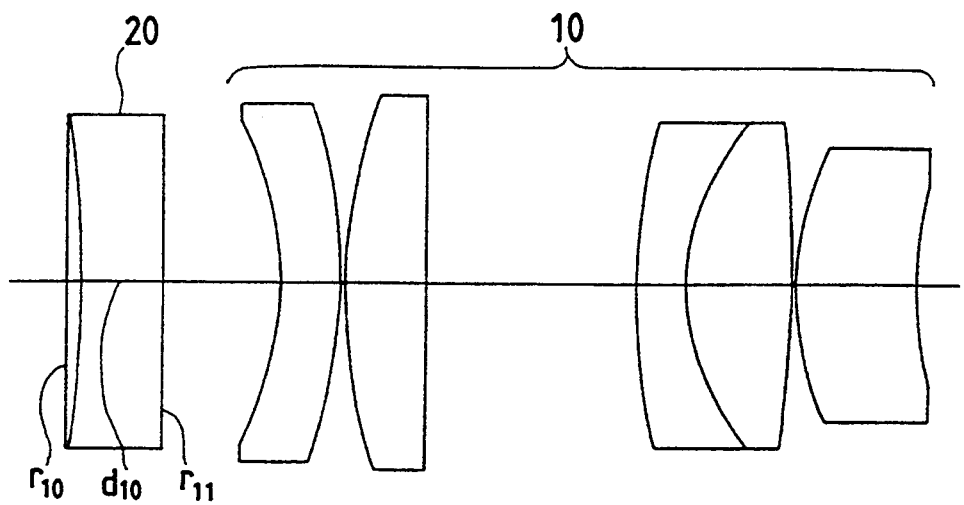
FIG. 15 is a simplified cross-sectional view of the objective lens used in Example 2 combined with an auxiliary lens inserted on an input side of the objective lens.
Figure 16A:
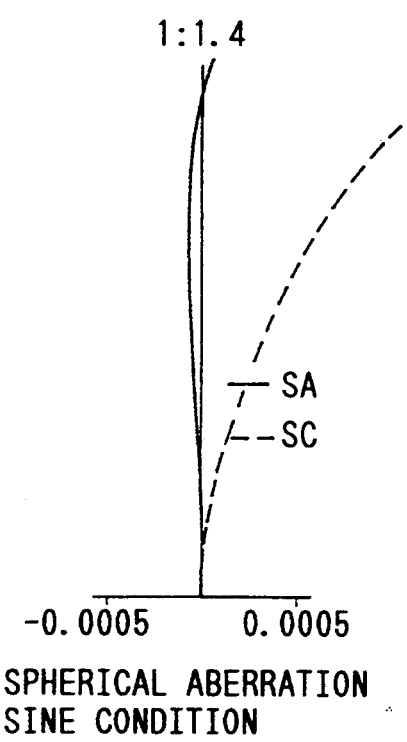
FIGS. 16A and 16B show graphs plotting spherical aberration, sine condition and astigmatism curves at a measurement wavelength for an optical system composed of the objective and auxiliary lenses shown in FIG. 15.
Figure 16B:
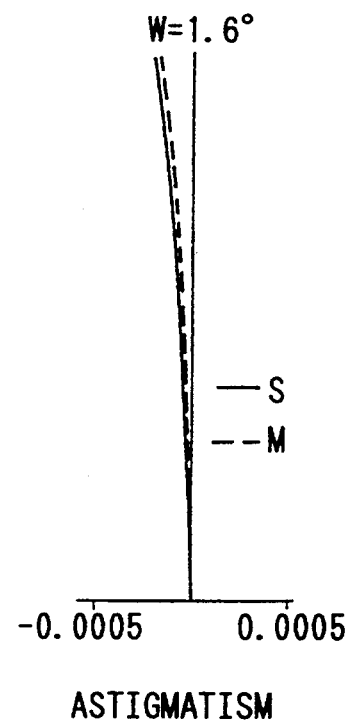

The performance of the objective lens 10 was measured in the presence of the auxiliary lens 20, as shown in FIG. 15, under the conditions outlined in Table 4. The spherical aberration, sine condition and astigmatism that developed are shown in FIGS. 16A and 16B and the corresponding wavefront aberrations are shown in FIGS. 17A and 17B.

TABLE 4

| Surface | fc = −55.899 | f/fc = −0.018 | | |
|---|---|---|---|---|
| | r | d | N | ν |
| 10 | −28.767 | 0.205 | 1.51633 | 64.1 |
| 11 | ∞ | | | |

EXAMPLE 3

Figure 18:
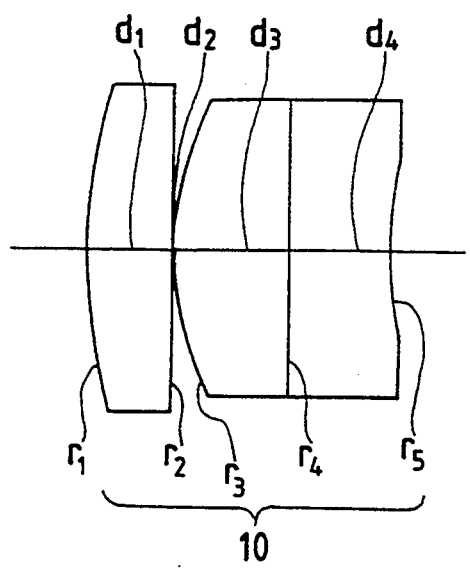
FIG. 18 is a simplified cross-sectional view of an objective lens used in Example 3.

FIG. 18 is a simplified cross-sectional view of an objective lens 10 used in this example. Numerical data listing the lens composition of the objective lens 10 are provided in Table 5. The numerical data provided in this example are presented with the same nomenclature as described in Example 1.

Figure 19A:
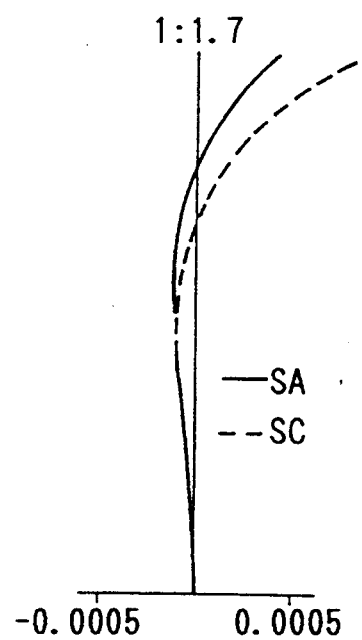
FIGS. 19A and 19B show graphs plotting spherical aberration, sine condition and astigmatism curves for the objective lens of FIG. 18 while performing at an operating wavelength.
Figure 19B:
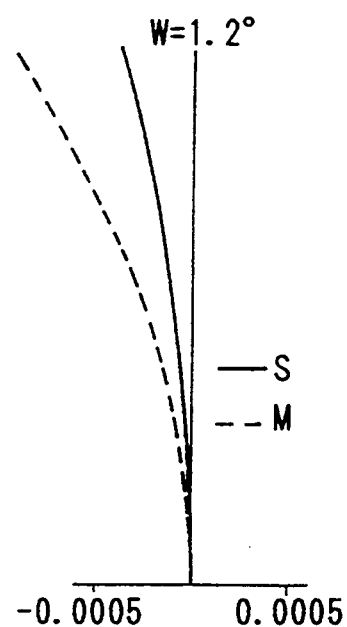

FIGS. 19A and 19B show a spherical aberration (SA), a sine condition (SC), a sagittal astigmatism (S), and a meridional astigmatism (M) at a design wavelength of 830 nm. FIGS. 20A and 20B show corresponding wavefront aberrations in the meridional and saggital directions, respectively, where a vertical axis of each graph plots the amount of aberration as measured in wavelengths.

Figure 22B:
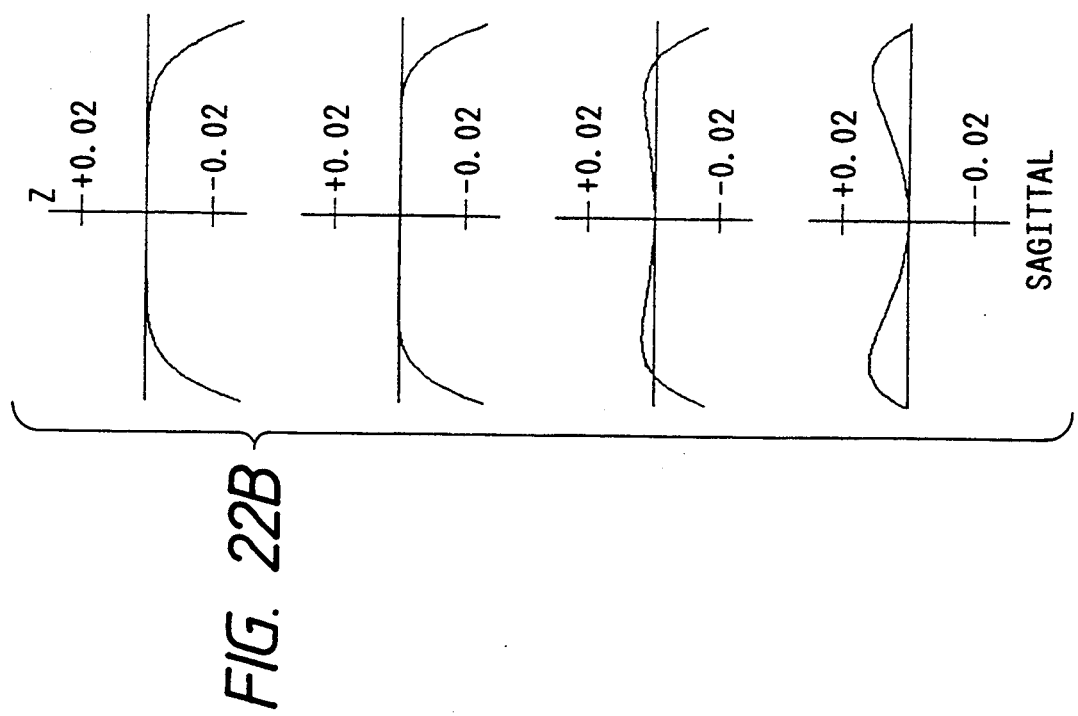
FIGS. 22A and 22B show graphs plotting wavefront aberration curves for the objective lens of FIG. 18 while performing at the measuring wavelength.
Figure 22A:
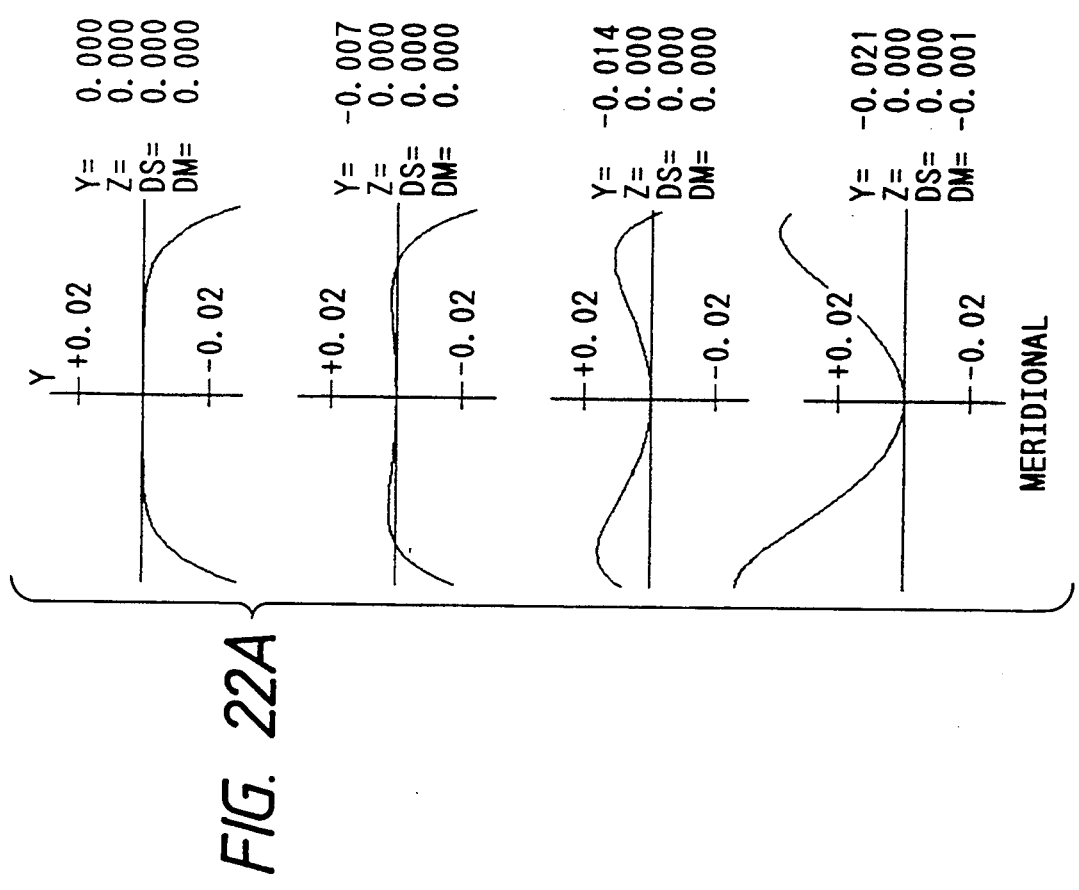

The performance of the objective lens 10 is measured with a He-Ne laser where λ=633 nm in the absence of an auxiliary lens 20. The spherical aberration, sine condition and astigmatism that developed are shown in FIGS. 21A and 21B. The corresponding wavefront aberrations are shown in FIGS. 22A and 22B.

TABLE 5

| Surface | FNO = 1:1.7 | f = 1.00 | W = 1.2° | |
|---|---|---|---|---|
| | r | d | N | ν |
| 1 | 1.043 | 0.157 | 1.77250 | 49.6 |
| 2 | 8.184 | 0.007 | | |
| 3 | 0.594 | 0.221 | 1.58913 | 61.2 |
| 4 | −7.857 | 0.186 | 1.84666 | 23.8 |
| 5 | 0.862 | | | |

Figure 23:
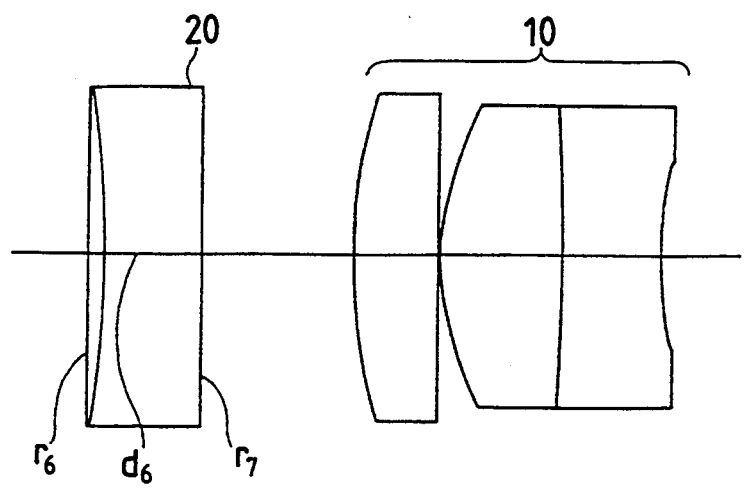
FIG. 23 is a simplified cross-sectional view of the objective lens of Example 3 combined with an auxiliary lens inserted on an input side of the objective lens.
Figure 24A:
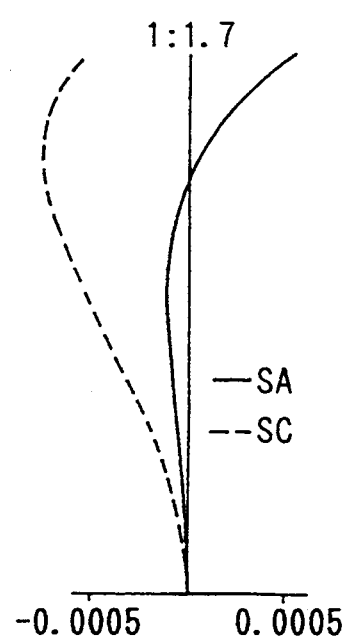
FIGS. 24A and 24B show graphs plotting spherical aberration, sine condition and astigmatism curves at a measurement wavelength for an optical system composed of the objective and auxiliary lenses as shown in FIG. 23.
Figure 24B:
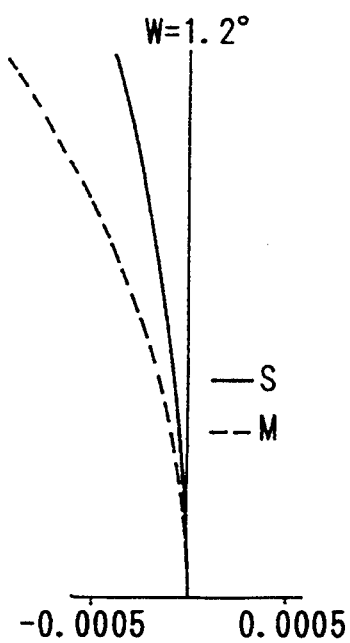

The performance of the objective lens 10 was measured in the presence of the auxiliary lens 20, as shown in FIG. 23, under the conditions outlined in Table 6. The spherical aberration, sine condition and astigmatism that developed are shown in FIGS. 24A and 24B, and the corresponding wavefront aberrations are shown in FIGS. 25A and 25B.

TABLE 6

| | fc = −69.399 | | f/fc = −0.014 | |
| --- | --- | --- | --- | --- |
| Surface | r | d | N | ν |
| 6 | −35.714 | 0.214 | 1.51633 | 64.1 |
| 7 | ∞ | | | |

What is claimed is:

1. A method of measuring the performance of a lens designed for operation with light of an operating wavelength, said method comprising the steps of passing measurement light at a measurement wavelength different from said operating wavelength through said lens, adjusting a wavefront curvature of said measurement light such that said lens will produce a spherical aberration substantially equal to the spherical aberration which would be produced for light at said operating wavelength, and measuring the performance of said lens in accordance with the light passed through said lens.

2. A method according to claim 1, wherein said lens is designed for use with plane wave incident light at said operating wavelength and wherein said step of measuring the performance of said lens is performed in accordance with an interference technique.

3. A method according to claim 2, wherein said method includes the steps of emitting measurement light from a light source, passing said measurement light through a collimating means to transform said measurement light into plane waves, splitting said measurement light into a reference beam and a measurement beam, passing said measurement beam through an auxiliary lens of weak positive power to transform said plane waves into spherical waves, passing said spherical waves through said lens to be measured, superposing said reference beam and said light passed through said lens to be measured to generate an interference pattern, and measuring the performance of said lens to be measured in accordance with said interference pattern.

4. A method according to claim 2, wherein said step of adjusting the wavefront curvature of said measurement light comprises the step of passing said measurement light through an auxiliary lens of weak positive power to transform said measurement light into spherical waves which are subsequently admitted to the lens to be measured.

5. A method according to claim 4, wherein said auxiliary lens and said lens to be measured satisfy the condition $|f/fc| < 0.04$, where f is the focal length of the lens to be measured and fc is the focal length of the auxiliary lens.

6. A method for measuring the performance of a lens to be measured comprising the steps of:
emitting rays of light from a light source;
transforming said emitted rays of light to rays of light having plane waves by a collimating means;
splitting said rays of light having plane wave front into a reference beam and a measurement beam by a separating means;
transforming said plane wave front of said measurement beam to a spherical wave front by passing said measurement beam through an auxiliary lens;
passing said measurement beam, passed through said auxiliary lens, through said lens to be measured;
superimposing said reference beam and said measurement beam passed through said lens to be measured so that an interference pattern is formed;
wherein said lens to be measured has a spherical aberration when said rays of light from said light source are incident to said lens to be measured with a plane wave front; and
wherein said measurement beam, passed through said auxiliary lens, suppresses said spherical aberration.

7. A method according to claim 6, wherein said rays of light from said light source have a wavelength different from an operating wavelength of said lens to be measured.

8. A method according to claim 6, wherein said auxiliary lens and said lens to be measured satisfy the condition $|f/fc| < 0.04$, where f is the focal length of said lens to be measured and fc is the focal length of said auxiliary lens.

9. A method according to claim 7, wherein said auxiliary lens has a positive power.

10. A method according to claim 8, wherein said auxiliary lens has negative power.

11. A method according to claim 6, further comprising the steps of:
reflecting said reference beam by a first reflecting means having a reference surface;
reflecting said measurement beam passed through said lens to be measured by a second reflecting means.

12. A method according to claim 6, wherein said interference pattern is formed on an image sensor.

13. An apparatus for measuring the performance of a lens comprising:
a light source;
means for collimating rays of light from said light source;
means for splitting said collimated rays of light into a reference beam and a measurement beam;
first reflecting means for reflecting said reference beam;
means for transforming said measurement beam to a convergent of divergent light beam so that said convergent light beam is incident to said lens;
second reflecting means for reflecting said measurement beam passed through said lens to be measured;
means for superimposing said reference beam reflected by said first reflecting means and said measurement beam reflected said second reflecting means to form an interference pattern.

14. A method according to claim 13, wherein said transforming means comprises an auxiliary lens.

15. A method according to claim 14, wherein said auxiliary lens has positive power.

16. A method according to claim 14, wherein said auxiliary lens has negative power.

17. A method according to claim 14, wherein said lens to be measured and said auxiliary lens satisfy the condition $|f/fc| < 0.04$, where f is the focal length of said lens to be measured and fc is the focal length of said auxiliary lens.

18. A method according to claim 13, wherein said splitting means comprises a half mirror.

19. A method according to claim 13, wherein said first reflecting means comprises a reference mirror.

20. A method according to claim 13, wherein said second reflecting means comprises a concave mirror.

* * * * *